United States Patent [19]

Gossmann et al.

[11] Patent Number: 5,496,140
[45] Date of Patent: Mar. 5, 1996

[54] BLIND RIVETS AND METHOD FOR ITS MANUFACTURE

[75] Inventors: Richard Gossmann, Dietzenbach; Eckhard Ditzel, Erzhausen, both of Germany

[73] Assignee: Gesipa Blindniettechnik GmbH, Frankfurt am Main, Germany

[21] Appl. No.: 352,244

[22] Filed: Dec. 8, 1994

[30] Foreign Application Priority Data

Dec. 17, 1993 [DE] Germany ............ 43 43 171.2

[51] Int. Cl.⁶ .................... F16B 13/04; F16B 13/06; B21K 1/44
[52] U.S. Cl. ............... 411/43; 411/34; 411/70; 470/30
[58] Field of Search ............... 411/34, 35, 36, 411/37, 38, 43, 69, 70; 470/28, 29, 30

[56] References Cited

U.S. PATENT DOCUMENTS

| | | | |
|---|---|---|---|
| 3,451,303 | 6/1969 | Biermann | 411/70 |
| 3,553,040 | 1/1971 | Bell | 411/34 X |
| 4,696,610 | 9/1987 | Wright | 411/43 X |
| 4,988,247 | 1/1991 | Summerlin | 411/38 |
| 5,248,231 | 9/1993 | Denham et al. | 411/43 |

FOREIGN PATENT DOCUMENTS

| | | |
|---|---|---|
| 0168355 | 1/1986 | European Pat. Off. . |
| 0277759 | 8/1990 | European Pat. Off. . |
| 1475101 | 7/1971 | Germany . |
| 2342203 | 7/1974 | Germany ............ 411/34 |

*Primary Examiner*—Neill R. Wilson
*Attorney, Agent, or Firm*—Darby & Darby

[57] ABSTRACT

A blind rivet includes a mandrel shaft having a head disposed at one axial end. A hollow rivet shell has a cylindrical shape including an inner cylindrical surface and an outer cylindrical surface. The rivet shell surrounds the mandrel shaft. The outer cylindrical surface has at least one attenuation groove, which includes at least two recesses. Each recess has a bottom surface that substantially forms a secant with respect to the outer cylindrical surface. A method of manufacturing a blind rivet comprises the steps of placing a mandrel shaft having a head within a hollow rivet shell, producing at least one attenuation groove in an outer cylindrical surface of the rivet shell after the placing step so that at least two recesses are formed. Each of the recesses has a bottom surface that substantially forms a secant with respect to the outer cylindrical surface.

18 Claims, 1 Drawing Sheet

BLIND RIVETS AND METHOD FOR ITS MANUFACTURE

BACKGROUND OF THE INVENTION

1. Field of the Invention

The present invention relates to a blind rivet and a drawing mandrel. The drawing mandrel has a mandrel head and a mandrel shaft, and the blind rivet has a cylindrical rivet shell surrounding the drawing mandrel for a portion of its length. The rivet shell has in its outer cylindrical surface at least one attenuation groove.

2. Description of the Related Art

A known blind rivet is disclosed in European Patent Application EP 0 168 355 A1, where several circumferential grooves or discontinuous recesses are provided in a tubular body 1 and are longitudinally located at some distance from each other. The use of these blind rivets is relatively flexible in that they may be used to connect two or more components of varying thickness. It is possible, within certain limitations, to rivet varying material thicknesses to each other, without the need to use a specially fitted blind rivet. However, there are difficulties with the "locking behavior" of this type of known rivet. Often the formation of the rivet head is not satisfactory and the rivet connection does not have the desired or necessary strength.

Another blind rivet is known from EP 0 277 759 B1, which also has a tubular shaft 11 that has zones of modified strength provided by circumferential grooves 27, 28 and 29. These grooves are produced by rolling, and during the rolling process the rivet shell is widened. Thus, the rivet shell does not sit tightly (i.e., with the necessary friction) on the drawing mandrel and therefore can move relative to the drawing mandrel. This makes it more difficult for a user to handle this type of blind rivet. Accordingly, the rivet shell, in many cases, must be properly positioned on the drawing mandrel before setting. Frequently, this rivet shell must be set several times with a rivet tool or setting tool, because the setting stroke is not adequate. This, of course, causes time loss in the setting process even though time saving was one of the purposes of using multiple range blind rivets in the first place.

SUMMARY OF THE INVENTION

An object of the present invention is to design a blind rivet which can be used over a varying range of thicknesses with simple handling and an improved locking property.

The present invention achieves this object with a multiple range blind rivet where each attenuation groove has several recesses in a circumferential direction which are spaced apart and are essentially in the same axial position. The bottoms of these recesses form a secant with respect to the cylindrical circumference of the rivet shell. The recesses do not abruptly end but they have a shape which leads to a gradual transition, from a thin metal thickness of the rivet shell in the area of the center of the recess, to a larger metal thickness at the ends of the recesses. This gradual transition leads to less material attenuation of the rivet shell and thereby provides higher strength for the future rivet connection. Additionally, because of the gradual transition, the tensions produced when the rivet head is formed are distributed better and the resulting material becomes more uniform. Thus, the danger of ripping, especially in the area adjacent the cross-section of the rivet head, is drastically reduced. The material also flows substantially better when the rivet head is being formed. The interruptions of the recesses create so-called "support-spots", which provide an improved structure of the rivet head and closure head, not only with the unprocessed rivet shell, but also with a finished rivet connection. This improvement can be attributed to, inter alia, the fact that more material remains for the use in the buildup of the head. Additionally, the manufacture of this type of rivet shell is much simpler, because no widening of the rivet shell occurs when the recesses are placed in the rivet shell.

The bottoms of the recesses preferably form a secant, which essentially is a straight line that runs parallel to a tangent of the cylindrical circumference. The bottoms of the recesses can, in their center, be deepened in the direction of the center axis of the rivet shell. In this case, the cavities can have a cross-section, which are limited by two circular lines, one to the circumference line of the rivet shell and the other by a circumference line of an imaginary circle, which has its fulcrum disposed radially outside of the rivet shell. In any case, the material attenuation caused by the recess in the circumferential direction decreases as far as the center of the recess and then increases again. This also creates an improved wall of the rivet hole because the material remaining between the recesses combined with the gradually decreasing material cross-section create support-spots or stabilizers which, when a tensile or axial force is applied will cause a symmetrical compression with a radial widening of the rivet shell in the area of the parts to be joined. In this manner, the rivet shell attaches itself to the hole on the entire inside cylindrical surface of the hole.

Applicants have observed that a rivet shell formed without the special formation of the recesses according to the present invention, buckles radially along its longitudinal axis and thereby does not fill the hole sufficiently. This is especially true with blind hole riveting, in which the blind rivet forms a radial widening which achieves a so called "dowel effect". The connection practically occurs by only bearing on the wall of the rivet hole. The recesses and the bead formation caused by the setting process achieve a high friction effect with subsequent interlocking, and this increases the separation resistance substantially. Through the symmetrical compression with proceeding radial widening, drilled hole tolerances can be balanced to a certain extent and thereby a good wall bearing on the rivet hole can be achieved.

The recesses are preferably disposed in pairs that are located diametrically opposite each other. Thus, during the production of the rivet, the required forces for the creation of the recesses will cancel themselves out.

In another embodiment of the present invention, tour recesses are provided by two diametrically opposed pairs of recesses. This number is sufficient to create the desired forming of folds of the rivet head, if material with a smaller thickness is to be riveted. The use of four recesses does not cause a significant diminishment of the rivet shell material, so that the rivet connection remains relatively stable.

In a preferred embodiment, the rivet shell has disposed between the adjacent recesses a predetermined angular area that is shaped as a hollow cylinder. In this area between the recesses, the rivet shell does not require further processing and it therefore maintains at least its original strength and therefore a much lower deformation can occur when the recesses are placed. Through the selection of the remaining and unprocessed area, the strength and the workability of the rivet can, within certain limitations, be varied.

The recesses are preferably formed by embossing. In this manner, the manufacture of the recesses is not done through removal of material from the rivet shell, but by a simple change in the distribution of the material of the rivet shell. This change in form brings about a strengthening and a change of the tension process, which during the rivet setting process, leads to forming of folds and beading of the rivet shell in certain rings.

The recesses preferably have a rounded cross-section. This rounded cross-section assures a better flow property for the rivet shell during the shaping of the rivet head. Additionally, the formation of cracks, as sharp edges may cause, are reliably prevented.

The rivet shell is preferably deformed toward the inside in the area of the recesses and sits with the inwardly deformed projections bearing against the mandrel shaft. The forming of the recesses in the rivet shell does not cause an external distortion of the rivet shell, which later becomes visible through the recesses. However, it does cause a distortion of the rivet shell in the area directed toward the drawing mandrel. In this area, the forming of the recesses causes the rivet shell to be seated against the drawing mandrel. This seating is limited to points or more practically very small surfaces. The seating assures that the rivet shell is seated tightly and with the needed strength and stability on the drawing mandrel. The seating also assures a relatively small amount of friction between the drawing mandrel and the rivet shell, which has a further beneficial effect during the shaping of the rivet head when the rivet is set.

The mandrel shaft is preferably provided with a cross-section reduction, which is formed as the rated breaking point of the mandrel shaft. At least one attenuation groove of the rivet shell is disposed in the area of the cross-section reduction. This further improves the friction behavior of the rivet shell on the drawing mandrel because the drawing mandrel is held tightly, with even higher reliability, within the rivet shell. This is especially the case when material from the rivet shell in this area penetrates into the recess of the cross-section reduction of the mandrel shaft. This results not only in friction, but even a form lock engagement between the rivet shell and the drawing mandrel, thereby providing a secure hold of the rivet shell on the drawing mandrel. For the forming behavior of the rivet shell during setting of the rivet, this small form lock practically makes no difference. However, this improved holding property of the rivet shell on the mandrel shaft provides better processing possibilities of the blind rivet with the use of automatic or semi-automatic rivet-setting machines. Of course, there could also be other profiling or grooving on the mandrel shaft, to provide an increase of the holding power. These profiles or grooves on the mandrel shaft could also be disposed directly below the recesses on the outer side of the rivet-shaft.

The rivet shell preferably has a bevel that is slanted towards the inside on its axial end that works together with the mandrel head. Due to this bevel, a countersink of the rivet shell and/or a pressure cone ring formation is prevented, due to the fact that in the early phase of forming the head in riveting, the friction forces are relatively small and are further reduced from the outer rivet shell edge to the drawing mandrel shaft to practically zero. Through this force distribution, the rivet material flows around the outer basis-edge of the mandrel head, then thins out some more and surrounds the mandrel head. This results in an undetachable rivet mandrel filling section, which is not movable. Thus, there is no source for noise formation, and the rivet connection is better protected against dust and water spray.

The distance between the end of the rivet shell closest to the attenuation groove and the end depending on the form of the axial and radial distance of the mandrel head, is selected such that with the set rivet, the mandrel head is surrounded by the rivet shell but is visible for a predetermined minimum portion of its length. This reduces further the likelihood of an occurrence of a previously mentioned pressure-cone ring formation. Further, no material separation occurs in the range of the rivet shell between a fixed cone ring below the mandrel head and a lesser fixed range.

The mandrel head preferably has a spherical shape. This shape is not only pleasing to the eye, but also reduces the risk of injuries and improves the flow behavior of the material of the rivet shell outside, and around its head, so that a secure rivet-shaft lock in the closure-end and a good seat and tight rivet connection can be produced.

The present invention is also directed toward a method for the production of a rivet where a drawing mandrel and a rivet shell are placed together and afterwards the recesses are produced.

With this method, no widening of the rivet shell occurs during the placing of the recesses, which would lead to a reduction of the holding power of the rivet shell on the drawing mandrel, but the contrary happens, namely a tightening of the holding power. The rivet shell thus remains seated securely on the drawing mandrel.

The recesses are preferably produced by embossing. Embossing is a relatively quick process, which can practically produce the desired shape of the recess in one operation. The only thing needed is a suitable tool which is to be pressed tangentially against the circumference of the rivet shell and then impressed.

In a preferred form, rivet shells are used, which, when drawn on the drawing mandrel have a predetermined oversize, whereby the rivet shell is partially transferred for insertion on the drawing mandrel for processing the recesses. The use of an oversized rivet shell simplifies the threading, inserting and moving of the rivet shell onto the mandrel. Through the placing of the recesses, particularly by embossing, the rivet shell will nevertheless be securely fastened on the drawing mandrel.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENT INVENTION

Figure 1:
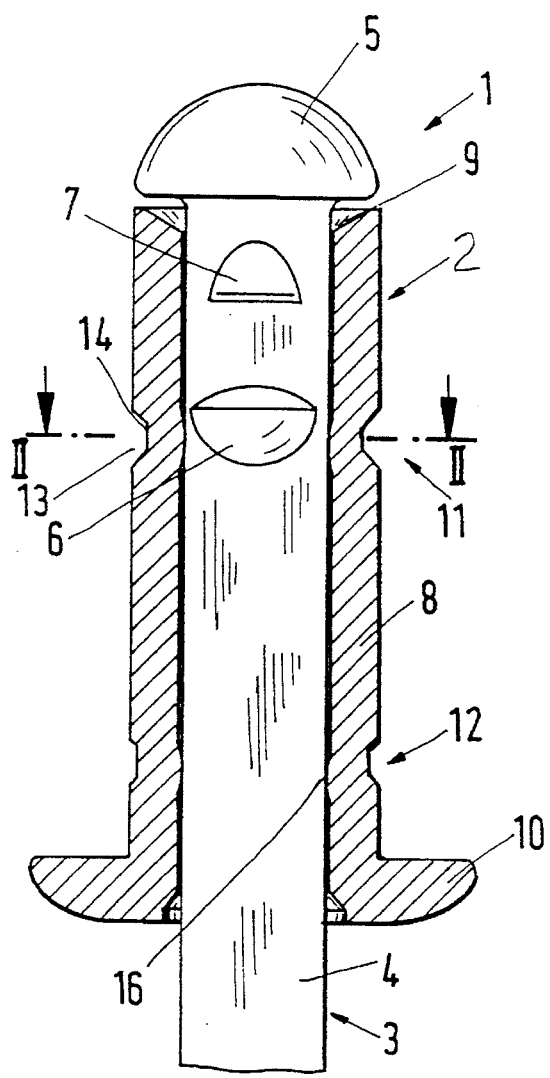
FIG. 1 is a cross-sectional view of a blind rivet according to the present invention.

Referring now to FIG. 1, a blind rivet 1 including a rivet shell 2 and a drawing mandrel 3 is illustrated. The drawing mandrel 3 has a mandrel shaft 4 and a mandrel head 5. The mandrel head 5 has essentially the shape of a semi-sphere. All materials which up to now have been conventionally used as the material for blind rivets can be used, e.g., steel, chrome-nickel-steel, nickel-copper-alloys and other stainless steels, aluminum, copper or its alloys, or even plastic resins.

Figure 2:
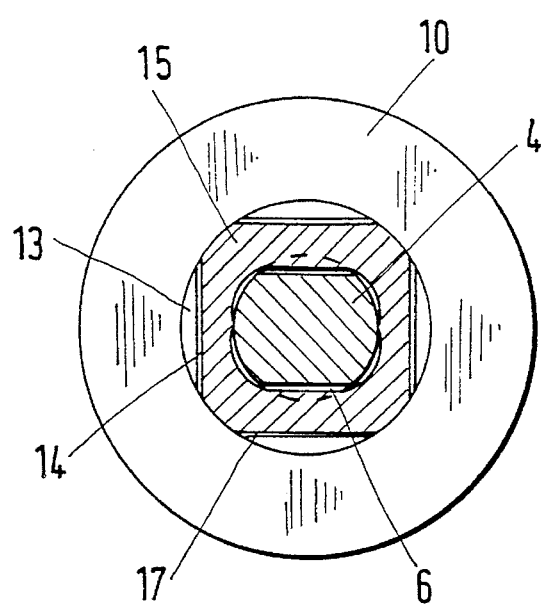
FIG. 2 is a sectional view taken along lines II—II of FIG. 1.

The mandrel shaft 4 has a reduced cross-section area 6 as illustrated in FIG. 2. The reduced cross-section defines the rated break point of the mandrel shaft 4. Additionally, surface structures 7 could be provided adjacent to the reduced cross-sectional area of shaft 4. These surface structures 7 could practically be in every conceivable shape, e.g., longitudinal knurls, cross knurls, under-cuts, coinings and/or material projections of any kind.

The rivet shell 2 is basically a hollow cylindrical body 8 which is pulled onto the drawing mandrel. A bevel 9 is disposed at the axial end of the rivet shell 2 which is in contact with the mandrel head 5. The bevel 9 causes the axial end of the rivet shell 2 to slant such that the axial surface of the rivet shell 2 drops from the outside diameter portion to the inside diameter portion. The bevel 9 is formed so that there is a smoother movement of the mandrel head 5 in the direction toward the rivet shell 2.

An annular shaped sethead 10 is disposed at the opposite axial end of rivet shell 2. In addition, the rivet shell 2 may have at least one and preferably two attenuation grooves 11 and 12. Each attenuation groove is, as can be seen in FIG. 2, formed by four recesses 13, which are distributed equally around the circumference of the rivet shell. These four recesses 13 are preferably arranged in pairs, which are located diametrically opposite each other. The shape of the recesses, includes a bottom flat wall 14, which runs along a secant of the cylindrical circumference of the rivet shell 2. In other words, the bottom wall 14 preferably runs parallel to a tangent of the cylindrical circumference of the rivet shell 2. The bottom wall 14 may, in certain cases, penetrate deeper into the wall thickness of the rivet shell 2. As can be seen in FIG. 2, angular areas 15 remain between the individual recesses 13, in which the original hollow cylindrical shape of the rivet shell 2 was not worked on or altered. In this area, the rivet shell retains its cylindrical shape. Due to the special shaping of recess 13, there is a gradual transfer from a relatively thin material thickness of rivet shell 1 in the center region of each recess 13 to the full material thickness of the rivet shell in the angular area 15. In the angular area 15 a so called "healthy" amount of material remains, which later leads to an improved design of a closing head that is made during riveting.

The recesses 13 are preferably made by embossing. It should be noted that the embossing step is most effective when the rivet shell 2 has already been set on the drawing mandrel 3. The embossing creates rounded shapes in the axial direction of the external circumferential surface of the rivet shell 2 adjacent to the recesses 13. Additionally, the embossing not only reshapes the external circumference of the rivet shell 2, but also a smaller reshaping occurs on the internal circumferential surface such that the rivet shell 2 is placed point-by-point, or at least in the range of small surfaces, against the mandrel shaft 4 of the drawing mandrel 3. In the area of the attenuation groove 12, a setting surface 16 is created on the internal circumferential surface, at which setting surface the rivet shell is seated on the drawing mandrel 3 by friction. In the area of the attenuation groove 11, the material of the rivet shell 2 is pushed into the cross-section reduction 6, as can be seen in FIG. 2. In this location, a material displacement is seen in area 17 into the cross-section reduction 6, which is shown in the figure by the phantom lines in the cross-hatch into the drawing mandrel 3. Here not only a friction closure is taking place, but even a form-closure between the rivet shell 2 and the drawing mandrel 3.

Figure 3:
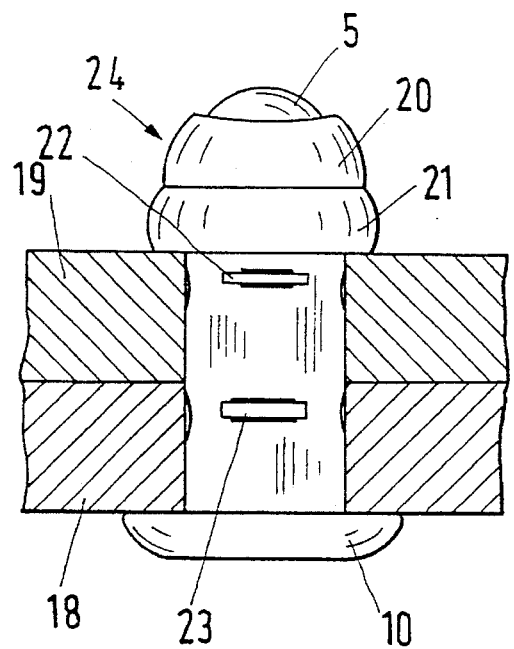
FIG. 3 is a sectional view of a rivet connection using a blind rivet according to the present invention.

FIG. 3 shows the design of a rivet connection between two plates 18, 19 by using a blind rivet of the kind shown in FIGS. 1 and 2. The sethead 10 is applied here to one of the plates 18. By drawing on drawing mandrel 3, for instance with a setting-device which has a mouthpiece seated at the sethead 10, the mandrel head 5 is thereby pulled into the rivet shell 2. Due to the presence of the attenuation grooves 11, 12, the mandrel head 5 cannot travel through the entire rivet shell 2. In the attenuation grooves a tightening of the materials has occurred, which now allows the mandrel head 5 to be drawn only to the first attenuation groove. Due to the increased setting force, the rivet shell 2 is shortened and fills the rivet hole. At the same time or slightly later, the rivet shell seats itself at the upper plate 19 in the form of beads 20, 21, which then form the head made during riveting. The production parts 18, 19 are then assembled. By means of this function the rivet adjusts to the material thickness, as would be the case. Although this cannot be reproduced exactly afterwards, one can apply the rule of thumb that between two beads an attenuation groove can always be found. The attenuation groove closest to the fastened end has its distance selected in this case, so that bead 20 surrounds the mandrel head 5 partially, while still leaving a portion of head 5 visible. The mandrel head 5, and with it the remaining section of the drawing mandrel 3, become tightly locked to the rivet shell 2.

The blind rivet shown in FIG. 3 has additional attenuation grooves. If the plates 18, 19 were thinner, these attenuation grooves would lead to more beads in certain cases, while forming the rivet-head 24. If one, however, would use thicker plates 18, 19, one would possibly have only one bead instead of the two beads 20, 21 as shown. In any case, a reliable rivet-connection is assured.

Having described the presently preferred exemplary embodiment of a new and improved blind rivet and a method for its manufacture, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A blind rivet comprising:

a mandrel shaft having a head disposed at one axial end;

a hollow rivet shell having a cylindrical shape including an inner cylindrical surface and an outer cylindrical surface, said rivet shell surrounding said mandrel shaft, said outer cylindrical surface having at least one attenuation groove, said at least one attenuation groove including at least two recesses each having a surface that substantially forms a secant with respect to said outer cylindrical surface.

2. A blind rivet according to claim 1, wherein said at least one attenuation groove is a reduced thickness section of said hollow rivet shell.

3. A blind rivet according to claim 1, wherein said at least two recesses are disposed at substantially the same axial position.

4. A blind rivet according to claim 3, wherein said at least two recesses are disposed diametrically opposite each other.

5. A blind rivet according to claim 4, wherein said at least one attenuation groove includes four recesses.

6. A blind rivet according to claim 5, wherein a predetermined angular area is disposed between adjacent recesses of said rivet shell, said predetermined angular area being in the shape of a hollow cylinder.

7. A blind rivet comprising:

a mandrel shaft having a head disposed at one axial end:

a hollow rivet shell having a cylindrical shape including an inner cylindrical surface and an outer cylindrical surface, said rivet shell surrounding said mandrel shaft, said outer cylindrical surface having at least one attenuation groove, said at least one attenuation groove including at least two recesses each having a surface that substantially forms a secant with respect to said outer cylindrical surface, said at least two recesses being disposed at substantially the same axial position, a predetermined angular area being disposed between adjacent recesses of said rivet shell, said predetermined angular area being in the shape of a hollow cylinder.

8. A blind rivet according to claim 7, wherein said at least two recesses have a rounded cross-section.

9. A blind rivet comprising:

a mandrel shaft having a head disposed at one axial end;

a hollow rivet shell having a cylindrical shape including an inner cylindrical surface and an outer cylindrical surface, said rivet shell surrounding said mandrel shaft, said outer cylindrical surface having at least one attenuation groove, said at least one attenuation groove including at least two recesses each having a surface that substantially forms a secant with respect to said outer cylindrical surface, said rivet shell being deformed radially inwardly in the area of said at least two recesses such that said radially inward deformation forms a projection that contacts said mandrel shaft.

10. A blind rivet comprising:

a mandrel shaft having head disposed at one axial end;

a hollow rivet shell having a cylindrical shape including an inner cylindrical surface and an outer cylindrical surface, said rivet shell surrounding said mandrel shaft, said outer cylindrical surface having at least one attenuation groove, said at least one attenuation groove including at least two recesses each having a surface that substantially forms a secant with respect to said outer cylindrical surface, wherein said mandrel shaft has an area of cross-sectional reduction.

11. A blind rivet according to claim 10, wherein a portion of said rivet shell, within the area of said at least two recesses, penetrates into said cross-section reduction of said mandrel shaft.

12. A blind rivet according to claim 11, wherein said rivet shell has a bevel disposed at one axial end corresponding to said head of said mandrel shaft, said bevel being angled such that an outer cylindrical portion of said bevel is disposed closer to said head than an inner cylindrical portion of said bevel.

13. A blind rivet according to claim 12, wherein a distance between said axial end of said rivet shell having said bevel and said at least one attenuation groove is predetermined such that when the rivet is set, said head is surrounded by said rivet shell but a pre-determined minimum portion of said head is exposed.

14. A blind rivet according to claim 13, wherein said head has a hemispherical shape.

15. A method of manufacturing a blind rivet comprising the steps of:

placing a mandrel shaft having a head within a hollow rivet shell, producing at least one attenuation groove in an outer cylindrical surface of said rivet shell after said placing step such that at least two recesses are formed, each of said recesses having a bottom surface that substantially forms a secant with respect to said outer cylindrical surface.

16. A method according to claim 15, wherein said at least two recesses are produced by embossing.

17. A method according to claim 15, wherein said rivet shell has a predetermined oversize with respect to said mandrel shaft.

18. A method according to claim 16, wherein said rivet shell has a predetermined oversize with respect to said mandrel shaft.

* * * * *